United States Patent

Meyer

(10) Patent No.: US 6,526,735 B2
(45) Date of Patent: Mar. 4, 2003

(54) TRACTOR DRAWBAR HITCH

(76) Inventor: Donald E. Meyer, 898 Old Kennett Rd., Greenville, DE (US) 19807

( * ) Notice: Subject to any disclaimer, the term of this patent is extended or adjusted under 35 U.S.C. 154(b) by 0 days.

(21) Appl. No.: 09/900,800

(22) Filed: Jul. 6, 2001

(65) Prior Publication Data

US 2002/0011055 A1 Jan. 31, 2002

Related U.S. Application Data

(60) Provisional application No. 60/216,438, filed on Jul. 6, 2000.

(51) Int. Cl.[7] ............................................. A01D 75/30
(52) U.S. Cl. ...................................... 56/6; 56/DIG. 14
(58) Field of Search ....................... 56/6, 7, 14.7, 16.7, 56/255, DIG. 9, DIG. 14, 249

(56) References Cited

U.S. PATENT DOCUMENTS

| | | | | |
|---|---|---|---|---|
| 2,153,876 A | * | 4/1939 | Roseman | 280/412 |
| 3,224,176 A | * | 12/1965 | Taylor | 56/7 |
| 3,514,126 A | * | 5/1970 | Fuss | 280/103 |
| 3,608,284 A | * | 9/1971 | Erdman | 56/6 |
| 3,640,345 A | * | 2/1972 | Sosalla | 172/311 |
| 3,757,500 A | * | 9/1973 | Averitt | 280/474 |
| 3,832,834 A | * | 9/1974 | Kovacs | 56/6 |
| 4,063,748 A | * | 12/1977 | Schmidt | 280/472 |
| 4,097,059 A | | 6/1978 | Springer, Sr. | |
| 4,113,273 A | * | 9/1978 | Gates | 172/311 |
| 4,330,981 A | * | 5/1982 | Hall et al. | 56/7 |
| 4,481,755 A | * | 11/1984 | Carr | 56/16.2 |
| 4,637,625 A | * | 1/1987 | Blackwell | 172/314 |
| 4,744,580 A | * | 5/1988 | Ryan | 56/6 |
| 4,815,259 A | | 3/1989 | Scott | |
| 4,896,485 A | * | 1/1990 | Gordy | 172/313 |
| 5,069,022 A | * | 12/1991 | Vandermark | 56/15.5 |
| 5,423,565 A | * | 6/1995 | Smith | 172/313 |
| 5,713,192 A | * | 2/1998 | Robinson | 56/13.5 |
| 5,851,020 A | | 12/1998 | Godwin | |
| 5,865,017 A | * | 2/1999 | Short | 56/249 |

* cited by examiner

Primary Examiner—Thomas B. Will
Assistant Examiner—Nathan Mammen
(74) Attorney, Agent, or Firm—Theresa M. Seal, Esq.

(57) ABSTRACT

A sturdy yet easy to assemble and disassemble T-shaped apparatus for ganging together a plurality of individually powered trail-behind mowers for towing by a tractor mower or other type all-terrain vehicle in cutting grass or similar vegetation. This design includes a tractor drawbar pivotally attached to a vehicle for towing having a pivot pin connected thereto at an opposite end to the vehicle, a center drawbar centrally attached to the tractor drawbar by a pivot hinge for connection with the pivot pin, and which is pivotally attached on either end by a left and a right mower drawbar attachment. The center drawbar also having a rear hitch centrally connected, as by welding, on an opposite side to the pivot hinge to pull additional mowers. The design features at least three pivot points to allow an even cut by a plurality of trail-behind mowers on bumpy, uneven terrain.

3 Claims, 4 Drawing Sheets

TRACTOR DRAWBAR HITCH

1. CROSS REFERENCE TO RELATED APPLICATIONS

The applicant and inventor, Donald E. Meyer, filed a provisional application, No. 60/216,438, on Jul. 6, 2000 for the "Tractor Drawbar Hitch" and hereby claims the benefit of the provisional application filing date.

2. BACKGROUND OF THE INVENTION

The present invention, "Tractor Drawbar Hitch", relates to a sturdy T-shaped apparatus for connecting a plurality of trail-behind mowers for towing by a power vehicle such as an all-terrain vehicle or the like, more particularly, to an assembly having at least three pivot points for ganging multiple trail-behind mowers for towing by a tractor-mower or all-terrain vehicle while allowing each mower to freely move up and down individually in rough terrain.

The "Tractor Drawbar Hitch" is designed to save considerable amount of time and manpower when mowing large areas of land. It is ideal for large estates, farms, and golf courses. The present invention allows fewer individuals to mow more grass in less time, and it sets up in minutes. And, due to the multiple pivot point hitches, it enables the user to mow uneven terrain easily and quickly.

The present invention is constructed of 2½ inch square tubing, 2 inch square tubing, pivot and lynch pins, ⅛ inch cable, 2×¼ inch flat iron, cable hooks and clamps. Two trail-behind mowers are designed to attach to either side of the device, and then attach to the back of a tractor mower or ATV. To use, simply attach the device's hinge pins (which features at least three pivot points) to each trail behind mower, and then attach the cable pins and drawbar pin to the tractor or ATV. A plurality of mowers may be added by simply attaching another mower to a rear hitch located at the back of the device.

Assemblies for connecting multiple mowers, or gang hitches, are well known as prior art and the following patents shall be discussed relative to the present invention: U.S. Pat. Nos. 4,097,059, 4,815,259, 5,069,022, and 5,851,020.

Prior art typically deals with gang hitch assemblies for which multiple off-the-shelf push mowers may be ganged together for creating a greater cutting width. The "Tractor Drawbar Hitch" relates to trail-behind mowers with much wider cutting widths, more specifically, it relates to trail-behind mowers manufactured by Swisher Mower Machine Company presently having a non-limiting cutting width of 60 inches. And yet, with minimal effort the present invention could easily include an attachment to retrofit with any manufactured trail-behind mower.

As shall be more fully illustrated in the detailed description, the present invention is both fundamental and versatile in that it connects to Swisher Mower Machine Company trail-behind mowers by merely sliding a drawbar into hollow crossbars already located at the top of each mower. As such, attachments could easily be included to interface with any make or model of trail-behind mowers.

Swisher™ presently has its' own hitch apparatus for pulling trail-behind mowers. It consists of a light duty hitch with one center pivot point offsetting a first mower behind a tractor-mower. A second mower can be vertically connected to the first mower whereby the two mowers could be pulled side by side behind the tractor-mower, however, such setup is not a recommended by Swisher™. Moreover, having no side terrain pivot points, such design does not sufficiently account for undulations or other variations in the contour of the terrain traversed by the assembly. A preferable design would be a heavy-duty hitch with multiple pivot points allowing for easier use, independent horizontal mower movement, and superior durability.

U.S. Pat. No. 4,097,059 issued to Springer on Jun. 27, 1978 defines a bracket for connecting a standard off the shelf push mower to a powered vehicle such as a motorcycle or the like. The principal concept of this design is to provide a vertical pivot point to better allow a two wheeled vehicle to pull a mower while enabling the rider to maintain control of the vehicle in rough terrain, it does not allow for a plurality of mowers to be pulled by a powered vehicle.

U.S. Pat. No. 4,815,259 issued to Scott on Mar. 28, 1989 teaches a frame designed for ganging together a plurality of standard off the shelf rotary push mowers for towing by a vehicle. A great feature of this design is that it allows vertical and horizontal pivoting between the mowers. And yet it calls for two mowers being ganged together behind a first mower therefore an inherent problem with this design is that a third mower could not be eliminated by a tractor-mower being used to pull the mowers. Consequently, the design requires three mowers and a powered vehicle to achieve triple the cutting width, and the use of a tractor-mower would only result in double cutting. A principal feature of the design incorporates skids to replace each of the rotary push mowers' tires to prevent the lightweight mowers from tipping when making turns. As such, it comprises multiple parts including an extensive list of small parts such as skids, cotter pins, cuter pins, and nuts and bolts. Assembly and disassembly is therefore burdensome and time consuming.

U.S. Pat. No. 5,069,022 issued to Vandermark on Dec. 3, 1991 discloses a gang mower apparatus that is powered from the power take off of the tractor to engage the mowers. This design requires a high horse power tractor, hydraulics, gearboxes, universal joints, hydraulic cylinders, hydraulic hoses and other wearing parts. Manufacturing would be costly and the inclusion of so many non-wear resistant components could result in multiple extended down times. Transport of this apparatus is cost prohibitive where hydraulics are necessary to raise the mowers for transport from one location to another and disassembly for transport would be too burdensome and time consuming. And further, the maximum travel speed between locations is only about twenty-five miles per hour.

U.S. Pat. No. 5,851,020 issued to Godwin on Dec. 22, 1998 teaches a gang hitch assembly having a mechanism to connect each individual push-type mower to the gang hitch with a pin and a spring for exerting a lifting force between the pin and the hitch thereby transferring some of the weight on the mower's front wheels to the gang hitch. The Principal concept of this design is to allow mowers with non-steerable front and rear wheels to have greater maneuverability while being pulled—a problem not inherent with trail-behind mowers, or the applicants design.

The present invention overcomes the problems associated with the prior art by providing few, easily manufactured parts, no springs or hydraulics, quick, easy assembly and disassembly, easy transport, a heavy-duty durable design, the option to use a tractor-type mower instead of pulling three mowers by a non-mowing vehicle, and at least three distinct pivot points to allow the mowers to have optimal horizontal movement.

What's more, a typical off the shelf push type mower generally has a cutting width in the 20–22 inch range; the typical trail-behind mower presently has a much greater cutting width and, the greater the width, the greater the weight. Tipping therefore is not a problem with trail-behind mowers when being ganged together and pulled behind a power vehicle. Moreover, typical trail-behind mowers have design features already included to prevent "tip-overs", such as wheel assemblies being mounted at potential tip points to allow the trail-behind mower to roll at an angle if necessary. Extensive experimentation by the applicant, however, has proven that the present invention has no need of the precautionary wheel assemblies provided on such mowers because tipping during turns, sharp or otherwise, is not a problem.

3. BRIEF SUMMARY OF THE INVENTION

Accordingly, a primary object of the invention is to provide a gang hitch apparatus for connecting a plurality of trail-behind mowers that is sturdy, versatile, and yet easy to assemble, disassemble and dismantle.

Another object of the invention is to provide a gang hitch apparatus for connecting two trail-behind mowers in staggered relation to a riding lawnmower for permitting efficient use of the riding lawnmower while eliminating the need for a third trail-behind mower.

A further object is to provide a gang hitch apparatus for connecting a plurality of trail-behind mowers that would be cheap and easy to manufacture with relatively few components and a minimal amount of small parts and wear points.

An additional object is to provide a gang hitch apparatus for connecting a plurality of trail-behind mowers having at least three pivot points to allow the mowers optimal horizontal movement on rough terrain.

These objects, as well as further objects and advantages will become readily apparent after reading the detailed description of the non-limiting illustrative embodiment with the accompanying drawings.

Briefly, the present invention comprises a tractor drawbar adapted to be releasably connected to a center drawbar thereby forming a T-shaped apparatus having a left and right drawbar being releasably connected to each end of the T-shaped apparatus thereby longitudinally extending the T to each trail-behind mower for a connection distal to the tractor drawbar so that each mower is pulled behind a tractor-mower on either side thereof with sufficient crossover of the cutting paths taken into account for turns.

More specifically, the invention comprises a tractor drawbar for pivotal attachment on a forward end thereof to a conventional drawbar of the tractor mower or all-terrain vehicle; a pivot pin being perpendicularly fixed to a left side of the rearward end of the tractor drawbar with the center drawbar having a pivot hinge fixedly secured at a central location thereof; the tractor drawbar is thus pivotally attached to the center drawbar via the pivot pin conically mating with the pivot hinge thus forming a T-shaped assembly; the center drawbar also having two hinge sleeves fixedly attached at a left and right end thereof; the hinge sleeves being attached perpendicular to a frontward and rearward side respectively of the center drawbar at two edges of both ends thereby creating a gap between the two sleeves a width consistent with the center drawbar; a left mower drawbar having a pivotal sleeve fixedly secured at a first end thereof; the left mower drawbar connecting to the left end of the center drawbar by inserting the sleeve into the gap thereof; insertion of a hinge pin through the three hinge sleeves completes and secures the connection; a right mower draw bar identical to the left mower drawbar connecting to the second end of the center drawbar in the same manner; and having a hitch fixedly attached to the center drawbar at an opposite side to the pivot hitch whereby a plurality of mowers may also be pulled by the gang hitch assembly.

4. BRIEF DESCRIPTION OF THE DRAWINGS

5. DETAILED DESCRIPTION OF THE PREFERRED EMBODIMENT

Figure 1:
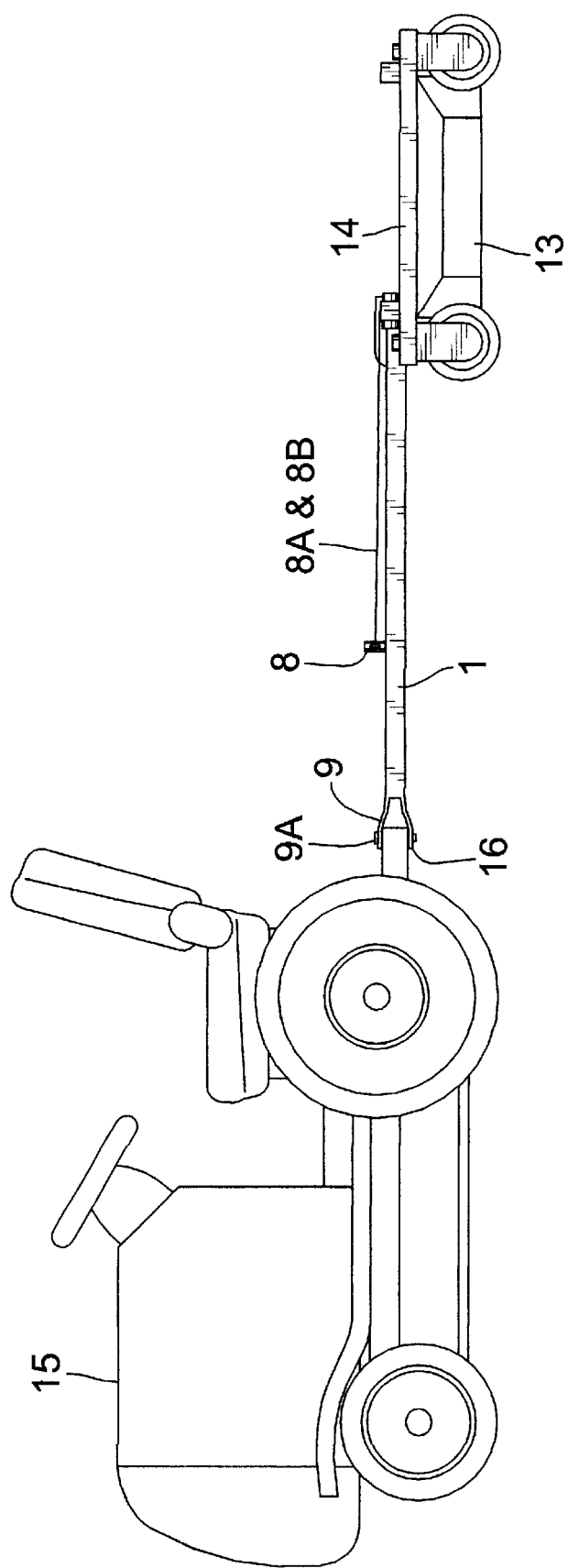
FIG. 1 is a side view in elevation of the preferred embodiment incorporating the principles of the present invention.

A tractor drawbar hitch illustrated in FIG. 1 permits a plurality of mowers 13 to be pulled by a single vehicle 15 using the vehicle's own tractor hitch 16. The mowers 13 illustrated in the FIG's are gas-powered mowers having individual motors. Specifically, the illustrated embodiment of the present invention represents all of the mowers 13 to be trail-behind mowers manufactured by Swisher Mower Machine Company and sold under its' trademark. As such, the preferred embodiment of the applicant's invention is best suited for trail-behind mowers.

Figure 2:
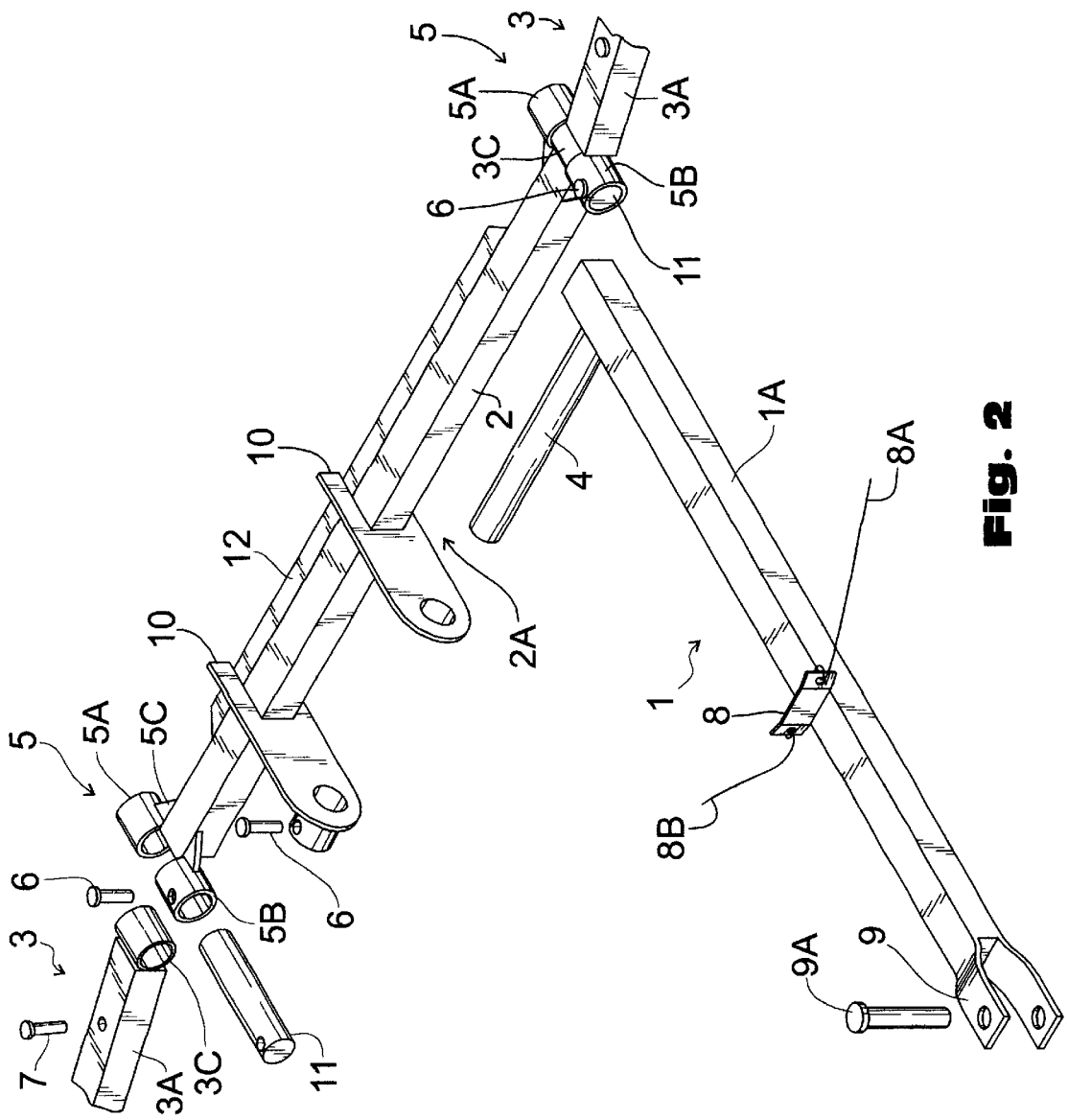
FIG. 2 is an elevational broken away view of the gang hitch apparatus of FIG. 1.

Referring now to FIG. 2, the tractor drawbar hitch fundamentally comprises a first tractor drawbar 1, a center drawbar 2, a pair of left and right mower drawbars 3, a rear hitch 12, and various means for which to attach the above-mentioned elements to each other and to the mowers 14.

Figure 3:
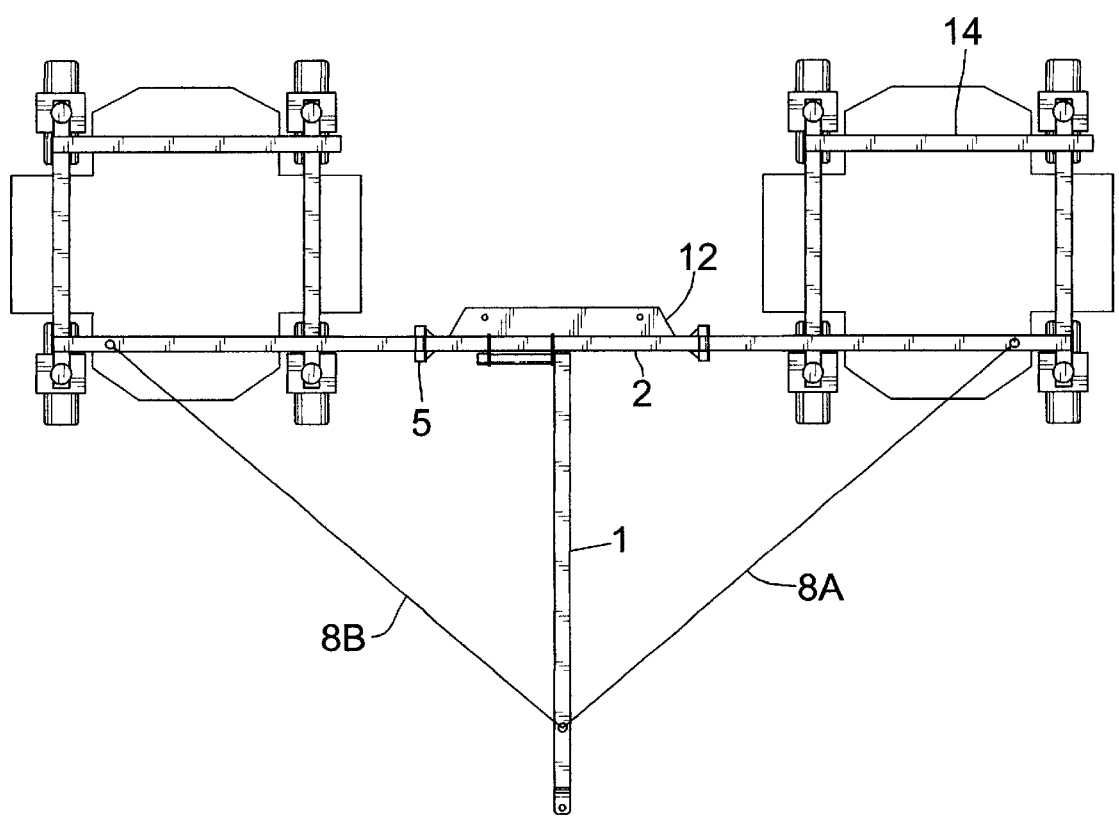
FIG. 3 is a top plan view of the assembled gang hitch apparatus of FIG. 1 ganging together two trail-behind lawn mowers.

FIG. 3 illustrates the present invention making economical use of a tractor mower. Only two trail-behind mowers are used to achieve up to triple the cutting width or in this case, fifteen feet of grass all at once with up to five acres being cut in one hour. One of many beneficial features of the illustrated embodiment in FIG. 3 is that the applicant's invention has a small number of components that are quick and easy to assemble and disassemble by simply inserting or pulling pins. Another advantage and principal feature behind the invention is that it disassembles into four main parts, that is, the tractor drawbar 1, the center drawbar 2 and two mower drawbars 3. In addition, the small parts total six pins, cable 8A and cable clamps (See also FIG. 2). There are not a lot of loose parts to worry about.

Figure 4:
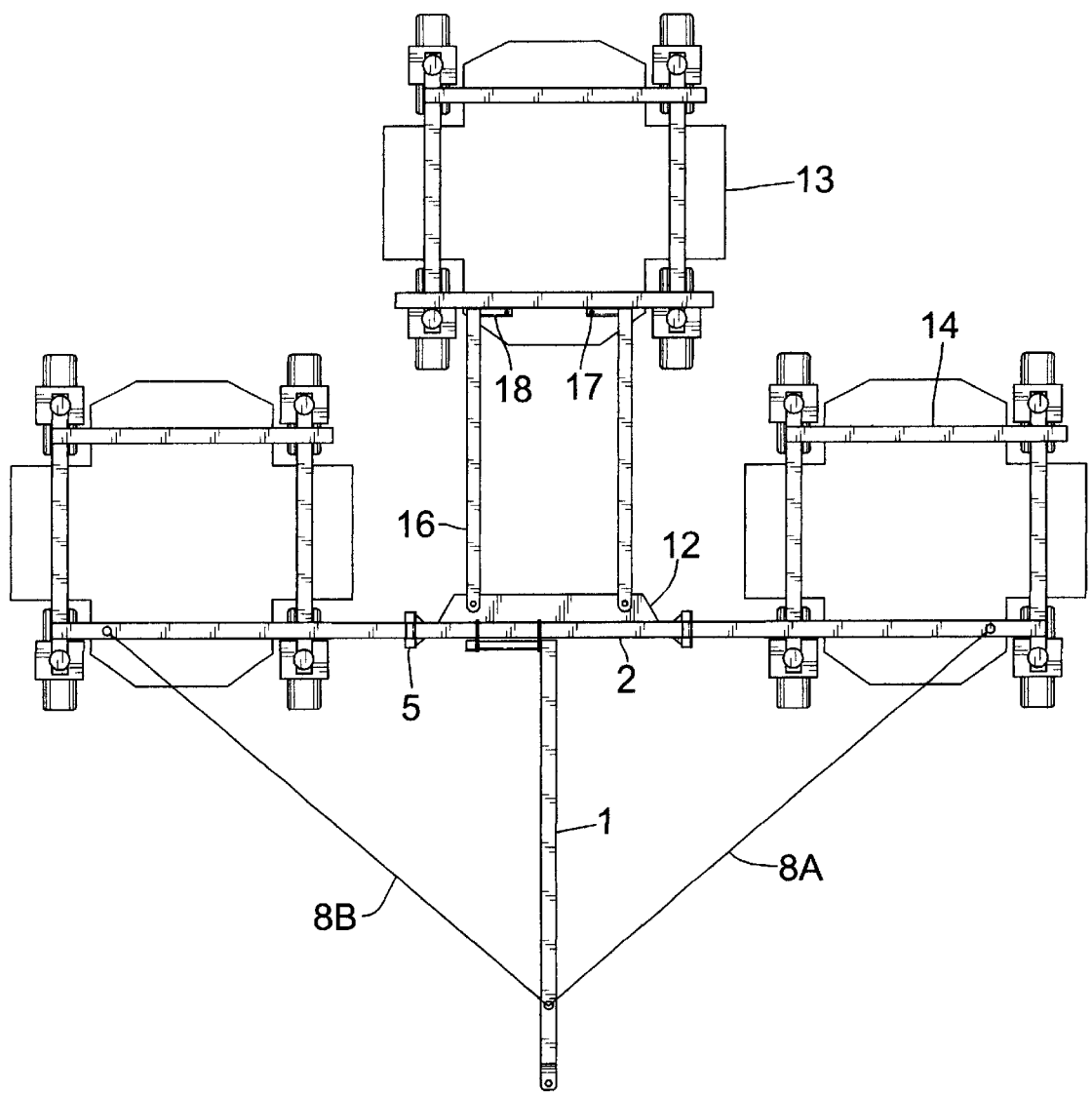
FIG. 4 is a top plan view of the assembled gang hitch apparatus of FIG. 1 ganging together three trail-behind lawn mowers.

FIG. 4 further illustrates the practical versatility of the present invention where a third mower 13 can be attached via the rear hitch 12 for consumers who prefer using a non-mower type vehicle 15 (shown on FIG. 1). This embodiment, as shall be fully set forth below, requires only a few additional parts while remaining quick and easy to assemble and disassemble. It does, unlike the embodiment in FIG. 3, require a minor modification to the third mower 13.

Again referring to FIG. 2, the tractor drawbar 1 has elongated hollow square tubing at least two and one half square-inches wide forming a beam 1a which is fixedly secured part way down one end to a center pivot pin 4, as by welding, the center pivot pin 4 being perpendicular to a left side of the beam. Formed at a forward end of the beam 1a is a U-shaped hitch 9. Aligned bores through each leg of the U-shaped hitch 9 receive a connecting pin 9a to connect the U-shaped hitch 9a to the tractor hitch 16, (shown in FIG. 1)

thus the tractor drawbar 1 is able to rotate laterally on the connecting pin 9a.

The tractor drawbar 1 attaches to the center drawbar 2 via the center pivot pin 4 of the tractor drawbar and a hinge sleeve 10 or the like fixedly secured longitudinally at a frontward side on the center drawbar 2. The hinge sleeve 10 having a first end thereof being fixed at a center point on the center drawbar 2 and extending horizontally to the left at least 16". Thus the hinge sleeve 10 of the center drawbar 2 can receive the center pivot pin 4 located on the left side of the tractor drawbar 1 from the right, thereby creating a T-Shaped assembly once the two elements are pivotally connected together. The center pivot pin 2 is thereafter securely fixed in place via a lynch pin or the like 6 extending through aligned bores located at an extreme end of the center pivot pin.

The center drawbar 2 has elongated hollow square tubing at least two and one half square-inches wide forming a beam 2a which connects at each end via a pivot hinge 5 to the left and right mower drawbars 3. Pivot hinge 5 comprises two sleeves, 5a and 5b, each being welded perpendicular to the center drawbar's frontward and rearward sides by a triangular flat iron sheet 5c. One side of the triangle 5c being welded to a sleeve with the adjacent side being welded to the center drawbar thereby causing each sleeve to be flush and at right angles with the extreme end of the center drawbar 2 while forming a gap between the two sleeves the width of the center drawbar 12 for connection thereof to the left mower drawbar 3.

The left and right mower drawbars 3 have elongated hollow square tubing at least two square-inches wide forming a lateral beam 3a which connects at one end to a hinge sleeve 3c, as by welding. The hinge sleeve 3c slides in between sleeves 5a and 5b whereby the mower drawbar 3 is pivotally connected to the center drawbar 2 by a pivot pin 11 passing through the three hinge sleeves 5a, 3c, and 5b respectfully. Aligned bores through sleeve 5a and pivot pin 11 receive a lynch pin or the like 6 to thereby fix the pivot pin 11 in place. The left and right mower drawbars 3 are therefore able to pivot horizontally with some limited vertical movement and are easily connected to the mowers 13 at an opposite end to the hinge sleeve 3c by simply sliding the end into a hollow crossbar 14 (shown on FIG. 4).

Since the hollow crossbar 14 is a standard feature of the trail-behind mowers 13 used with this preferred embodiment, connecting each mower to a mower drawbar is extremely fundamental. Thus, once connected, aligned bores through crossbar 14 and mower drawbar 3 receive a lynch pin or the like 7 to securely fix the mower drawbar 3 in place.

Illustrated in FIG. 4, the center drawbar also has a rear hitch attached, as by welding, at a rearward side of the center drawbar for pivotal attachment to a third mower 13 via a pair of elongated hollow square tubing 16 at least two and one half square-inches wide forming a beam which is fixedly secured at one end to a pivot pin 17, as by welding, the pivot pin 17 being perpendicular to a left and right side of each beam respectively. Formed at a forward end of each beam 16 is a U-shaped hitch 19. Aligned bores through each leg of the U-shaped hitch 19 and corresponding bores formed in the rear hitch receive a connecting pin 19a to connect the U-shaped hitch 9a to the rear hitch 12, thus the third mower 13 is able to rotate laterally on the connecting pin 19a. The rear hitch being constructed of 2×¼ inch flat iron or the like, and being at least 2" 10' long. And finally, eyes affixed, as by welding, to each mower crossbar allowing a cable connection between each of the two mowers 13 via a cable assembly 8 affixed to a top forward location of the tractor drawbar beam thereby allowing a mower to bounce off of an obstruction, such as a tree or the like, rather than get caught on an obstruction and possibly bend a component of the assembly.

It will be understood that various changes in the details, materials, arrangements of parts and operation conditions which have been herein described and illustrated in order to explain the nature of the invention may be made by those skilled in the art within the principals and scope of the invention.

Having thus set forth the nature of the invention, what is claimed is:

1. A T-shaped gang hitch apparatus for towing a plurality of trail-behind mowers by a vehicle for cutting grass and the like, which comprises:

a tractor drawbar having an elongated beam, a center pivot pin affixed to and extending perpendicularly from a rearward left side of said tractor drawbar beam, and a means formed on a frontward end of said tractor drawbar beam for pivotal attachment to the vehicle for towing;

a center drawbar having an elongated beam, a pair of hinge sleeves affixed perpendicularly and extending from a frontward and a rearward side of either extreme end of said beam, and a sleeve affixed to and extending laterally on a forward side of said beam such that when said center pivot pin of said tractor drawbar extends through said sleeve for attachment, said tractor drawbar is centered with and perpendicular to said center drawbar;

a pair of mower drawbars having an elongated beam, a hinge sleeve affixed perpendicularly to a forward end of each said beam for pivotal attachment to either end of said center drawbar, a pair of hinge pins securing said pivotal attachment by vertically extending through all three sleeves once each said mower drawbar hinge sleeve is aligned between said pair of hinge sleeves of said center drawbar beam, and a means formed on a second end of each said mower drawbar beam for attachment to a mower;

said means for attaching said pair of mower drawbars to a pair of trail-behind mowers comprises a bore defined in a rearward end of said mower drawbar, a bore formed in a hollow crossbar of said mower, and a lynch pin for extending through each of said bores once said mower drawbar is inserted into said mower's hollow crossbar and each of said bores are aligned;

a rear hitch centrally affixed to a rearward side of said center drawbar comprising a flat metal sheet at least two inches wide, at least a quarter inch thick, and being at least thirty-four inches long;

a pair of hitch drawbars having an elongated beam with a means formed at a forward end for pivotal attachment to said rear hitch, and a means formed on a rearward end of said hitch drawbar beam for attachment to a third mower;

a cable attachment affixed perpendicular with a frontward top side of said tractor drawbar beam having a flat metal rectangle with left and right sides extending at least one half inch and at a slight rearward angle beyond the tractor drawbar, and also having bores formed in either extended side;

a cable assembly having a cable and cable clamps; and an eye affixed to each mower crossbar at a point distal to said tractor drawbar for receipt of said cable after passing through said bores in said cable attachment on said tractor drawbar and being secured and tightened by said cable clamp, thereby allowing a mower to bounce off of an obstruction, such as a tree or the like, rather than get caught on an obstruction and possibly bend a component of the assembly.

2. The apparatus as in claim 1 wherein said means for attaching said pair of hitch drawbars to said rear hitch comprises:

- a U-shaped hinge having two adjacent legs extending laterally from said forward end of each said hitch drawbar beam, also having aligned bores defined in each leg of said U-Shaped hinge;
- a corresponding pair of bores defined in said rear hitch; and
- a pair of hinge pins such that when said bores of said rear hitch are aligned with said bores of each said U-shaped hinge, each of said hinge pins can vertically extend all the way through each of said bores of said U-shaped hinge and said bore of said hitch drawbar beam.

3. The apparatus as in claim 1 wherein said means for attaching said pair of hitch drawbars to said third mower comprises:

- a pivot pin affixed to and extending laterally from a leftward side of said first drawbar beam;
- a pivot pin affixed to and extending laterally from a rightward side of said second drawbar beam; and
- two corresponding hinge sleeves affixed to and extending laterally on a forward side of said mower's front crossbeam such that each of said pivot pins extend longitudinally through each of said corresponding sleeves.

* * * * *